(12) United States Patent
Doerr

(10) Patent No.: US 12,676,679 B2
(45) Date of Patent: Jul. 7, 2026

(54) ELECTRONIC DEMULTIPLEXING FOR DUAL-POLARIZATION (DP) INTENSITY-MODULATED DIRECT DETECTION (IMDD) OPTICAL COMMUNICATION SYSTEMS

(71) Applicant: Aloe Semiconductor Inc., Middletown, NJ (US)

(72) Inventor: Christopher R. Doerr, Middletown, NJ (US)

(73) Assignee: Aloe Semiconductor Inc., Middletown, NJ (US)

( * ) Notice: Subject to any disclaimer, the term of this patent is extended or adjusted under 35 U.S.C. 154(b) by 289 days.

(21) Appl. No.: 18/235,032

(22) Filed: Aug. 17, 2023

(65) Prior Publication Data

US 2025/0062832 A1     Feb. 20, 2025

(51) Int. Cl.
| | |
|---|---|
| *H04B 10/60* | (2013.01) |
| *H04B 10/532* | (2013.01) |
| *H04B 10/564* | (2013.01) |
| *H04B 10/61* | (2013.01) |
| *H04B 10/64* | (2013.01) |
| *H04B 10/66* | (2013.01) |
| *H04B 10/69* | (2013.01) |
| *H04J 14/06* | (2006.01) |

(52) U.S. Cl.
CPC ......... *H04B 10/532* (2013.01); *H04B 10/564* (2013.01); *H04B 10/614* (2013.01); *H04B 10/60* (2013.01); *H04B 10/64* (2013.01); *H04B 10/66* (2013.01); *H04B 10/69* (2013.01); *H04J 14/06* (2013.01)

(58) Field of Classification Search
CPC .. H04B 10/532; H04B 10/564; H04B 10/614; H04B 10/60; H04B 10/64; H04B 10/66; H04B 10/69; H04J 14/06
USPC .................. 398/43–103, 140–172, 202–214
See application file for complete search history.

(56) References Cited

U.S. PATENT DOCUMENTS

| | | | | |
|---|---|---|---|---|
| 9,692,521 B1 * | 6/2017 | Zhou | ................... | H04B 10/532 |
| 10,177,872 B1 * | 1/2019 | Wang | ................... | H04B 10/506 |
| 11,588,549 B1 * | 2/2023 | Zarkovsky | .............. | H04J 14/06 |
| 2003/0043440 A1 * | 3/2003 | Suzaki | .............. | H04B 10/6971 |
| | | | | 398/202 |

(Continued)

*Primary Examiner* — Dibson J Sanchez
(74) *Attorney, Agent, or Firm* — Fish & Richardson P.C.

(57)     ABSTRACT

A dual-polarization (DP) intensity-modulated direct detection (IMDD) receiver includes an input port configured to receive input light; an optical polarization splitter configured to split the input light into a pair of optical transmission paths; a pair of photodetectors including (i) a first photodetector configured to detect light at a first carrier frequency and output an electrical signal into a first electrical transmission path, (ii) a second photodetector configured to detect light at a second carrier frequency and output an electrical signal into a second electrical transmission path, wherein the first carrier frequency and the second carrier frequency are separated by a frequency difference; and an electrical 2×2 multi-input-multi-output (MIMO) polarization demultiplexer configured to input the first electrical transmission path and the second electrical transmission path and perform electrical 2×2 MIMO polarization demultiplexing to output a first demultiplexed signal and a second demultiplexed signal.

21 Claims, 8 Drawing Sheets

400

Direct detection receiver

(56) References Cited

U.S. PATENT DOCUMENTS

| | | | | |
|---|---|---|---|---|
| 2008/0159741 A1* | 7/2008 | Secondini | .......... | H04B 10/2569 |
| | | | | 398/79 |
| 2009/0202243 A1* | 8/2009 | Qian | ...................... | H04B 10/61 |
| | | | | 398/79 |
| 2011/0310951 A1* | 12/2011 | Cvijetic | ............... | H04B 10/614 |
| | | | | 375/233 |
| 2012/0134676 A1* | 5/2012 | Kikuchi | .................. | H04J 14/06 |
| | | | | 398/65 |
| 2012/0251110 A1* | 10/2012 | Cvijetic | ............... | H04L 25/022 |
| | | | | 398/65 |
| 2013/0044974 A1* | 2/2013 | Doerr | ...................... | G02F 1/225 |
| | | | | 385/3 |
| 2013/0195455 A1* | 8/2013 | Jansen | ................. | H04B 10/548 |
| | | | | 398/65 |
| 2014/0369685 A1* | 12/2014 | Calabro | ............. | H04L 27/2672 |
| | | | | 398/65 |
| 2019/0089479 A1* | 3/2019 | Yamauchi | ............ | H04B 10/532 |
| 2020/0083995 A1* | 3/2020 | Suzuki | ................... | H04L 27/26 |
| 2021/0044361 A1* | 2/2021 | Suhr | ................. | H04B 10/6161 |
| 2022/0094439 A1* | 3/2022 | Schmidt-Langhorst | ..................... | |
| | | | | H04B 10/614 |
| 2025/0247164 A1 | 7/2025 | Doerr | | |

* cited by examiner

ELECTRONIC DEMULTIPLEXING FOR DUAL-POLARIZATION (DP) INTENSITY-MODULATED DIRECT DETECTION (IMDD) OPTICAL COMMUNICATION SYSTEMS

TECHNICAL FIELD

The present disclosure generally relates to demultiplexers for dual-polarization (DP) optical communication systems.

BACKGROUND

In optical communication systems, multiplexing techniques (such as polarization-division multiplexing (PDM)) can increase communication capacity and/or photon efficiency by multiplexing different signals over different channels (e.g., different polarization modes) for simultaneous transmission through a single fiber. However, a challenge of using PDM is that the polarization modes tend to undergo random and unpredictable rotations and losses as they propagate through an optical communication system, for example due to stress in the glass fiber (bending and twisting), ambient temperature changes, or other non-idealities in the communication system. As a result, the signals in the different polarization modes become mixed among each other when they are received, resulting in crosstalk between signals on the different channels. In such scenarios, the signals must be unmixed at the receiver through multiple-input-multiple-output (MIMO) demultiplexing.

SUMMARY

Implementations of the present disclosure are generally directed to polarization demultiplexers for multiple-input-multiple-output (MIMO) polarization demultiplexing. In some implementations, electronic demultiplexing is used to perform demultiplexing of dual-polarization (DP) intensity-modulated direct-detection (IMDD) signals. In some implementations, the electronic demultiplexing can be used in combination with optical demultiplexing to perform demultiplexing of the DP-IMDD signals.

In one aspect, a dual-polarization (DP) intensity-modulated direct detection (IMDD) receiver includes an input port configured to receive input light; an optical polarization splitter configured to split the input light into a pair of optical transmission paths; a pair of photodetectors including (i) a first photodetector configured to detect light at a first carrier frequency and output an electrical signal into a first electrical transmission path, (ii) a second photodetector configured to detect light at a second carrier frequency and output an electrical signal into a second electrical transmission path, wherein the first carrier frequency and the second carrier frequency are separated by a frequency difference; and an electrical 2×2 multi-input-multi-output (MIMO) polarization demultiplexer configured to input the first electrical transmission path and the second electrical transmission path and perform electrical 2×2 MIMO polarization demultiplexing to output a first demultiplexed signal and a second demultiplexed signal.

Implementations include one or more of the following. The DP-IMDD receiver, wherein the electrical 2×2 MIMO polarization demultiplexer includes four adjustable gain elements interconnected in a butterfly configuration. The DP-IMDD receiver, wherein the electrical 2×2 MIMO polarization demultiplexer includes: a first splitter configured to split the first electrical transmission path into a third electrical transmission path and a fourth electrical transmission path; a second splitter configured to split the second electrical transmission path into a fifth electrical transmission path and a sixth electrical transmission path; a first gain element configured to apply a controllable gain on the third electrical transmission path; a second gain element configured to apply a controllable gain on the fourth electrical transmission path; a third gain element configured to apply a controllable gain on the fifth electrical transmission path; a fourth gain element configured to apply a controllable gain on the sixth electrical transmission path; a first summing element configured to sum an output of the first gain element and an output of the third gain element; and a second summing element configured to sum an output of the second gain element and an output of the fourth gain element. The DP-IMDD receiver, further including at least one additional electrical transmission path configured with time delays and gains. The DP-IMDD receiver, wherein electrical 2×2 MIMO polarization demultiplexer is configured to perform the electrical 2×2 MIMO polarization demultiplexing in an analog electronic portion of the DP-IMDD receiver. The DP-IMDD receiver, wherein electrical 2×2 MIMO polarization demultiplexer is configured to perform the electrical 2×2 MIMO polarization demultiplexing in a digital electronic portion of the DP-IMDD receiver. The DP-IMDD receiver, further including: a first analog-to-digital converter (ADC) configured in the first electrical transmission path between the first photodetector and the electrical 2×2 MIMO polarization demultiplexer; and a second ADC configured in the second electrical transmission path between the second photodetector and the electrical 2×2 MIMO polarization demultiplexer. The DP-IMDD receiver, further including: a first transimpedance amplifier (TIA) configured in the first electrical transmission path between the first photodetector and the electrical 2×2 MIMO polarization demultiplexer; and a second TIA configured in the second electrical transmission path between the second photodetector and the electrical 2×2 MIMO polarization demultiplexer. The DP-IMDD receiver, wherein the frequency difference between the first carrier frequency configured to be detected by the first photodetector and the second carrier frequency configured to be detected by the second photodetector is greater than a signal symbol rate. The DP-IMDD receiver, further including an optical 2×2 MIMO demultiplexer configured to receive light in the pair of optical transmission paths from the optical polarization splitter, and perform optical 2×2 MIMO polarization demultiplexing to output a pair of optical signals. The DP-IMDD receiver, wherein the pair of photodetectors are configured to receive the pair of optical signals that are output from the optical 2×2 MIMO polarization demultiplexer, and wherein the pair of photodetectors are configured to output the first electrical transmission path and the second electrical transmission path which are input to the electrical 2×2 MIMO demultiplexer. The DP-IMDD receiver, where the optical 2×2 MIMO demultiplexer provides only partial demultiplexing for one or both of the pair of optical signals that are output from the optical 2×2 MIMO demultiplexer. The DP-IMDD receiver, wherein the optical 2×2 MIMO demultiplexer includes: a first optical phase shifter configured to receive the pair of optical transmission paths from the optical polarization splitter and apply a first relative phase shift between the pair of optical transmission paths; a first 2×2 optical coupler configured to combine the pair of optical transmission paths and output a second pair of optical transmission paths; a second optical phase shifter configured to apply a second relative phase shift between the second pair of optical transmission paths;

3 a second 2×2 optical coupler configured to combine the second pair of optical transmission paths and output a third pair of optical transmission paths. The DP-IMDD receiver, wherein the optical 2×2 MIMO demultiplexer further includes: a third optical phase shifter configured to apply a third relative phase shift between the third pair of optical transmission paths; a third 2×2 optical coupler configured to combine the third pair of optical transmission paths and output a fourth pair of optical transmission paths; and a pair of MIMO outputs configured to output the pair of optical signals from the fourth pair of optical transmission paths. The DP-IMDD receiver, wherein the value of the first relative phase shift applied by the first optical phase shifter is binary among c+π/2 and c−π/2, where c is a real number. The DP-IMDD receiver, wherein the second optical phase shifter is configured to apply a value of the second relative phase shift within a finite range that includes −nπ and +nπ, where n is an integer. The DP-IMIDD receiver, wherein the third optical phase shifter is configured to operate between 0 and +nπ, based on the value of the first relative phase shift being c−π/2, and is configured to operate between −nπ and 0, based on the value of the first relative phase shift being c+π/2, where n is an integer.

In another aspect, a method of performing dual-polarization (DP) intensity-modulated direct detection (IVDD) reception includes: receiving input light through an input port; splitting, through an optical polarization splitter, the input light into a pair of optical transmission paths; (i) detecting light at a first carrier frequency with a first photodetector and outputting an electrical signal into a first electrical transmission path, (ii) detecting light at a second carrier frequency with a second photodetector and outputting an electrical signal into a second electrical transmission path, wherein the first carrier frequency and the second carrier frequency are separated by a frequency difference; and performing electrical 2×2 multi-input-multi-output (MIMO) polarization demultiplexing based on the first electrical transmission path and the second electrical transmission path, to output a first demultiplexed signal and a second demultiplexed signal.

Implementations include one or more of the following. The method, wherein the frequency difference between the first carrier frequency detected by the first photodetector and the second carrier frequency detected by the second photodetector is greater than a signal symbol rate. The method, further including: performing optical 2×2 MIMO demultiplexing by receiving light in the pair of optical transmission paths from the optical polarization splitter, and performing optical 2×2 MIMO polarization demultiplexing to output a pair of optical signals.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates an example of a dual-polarization (DP) communication system, according to implementations of the present disclosure;

4

Figure 3:
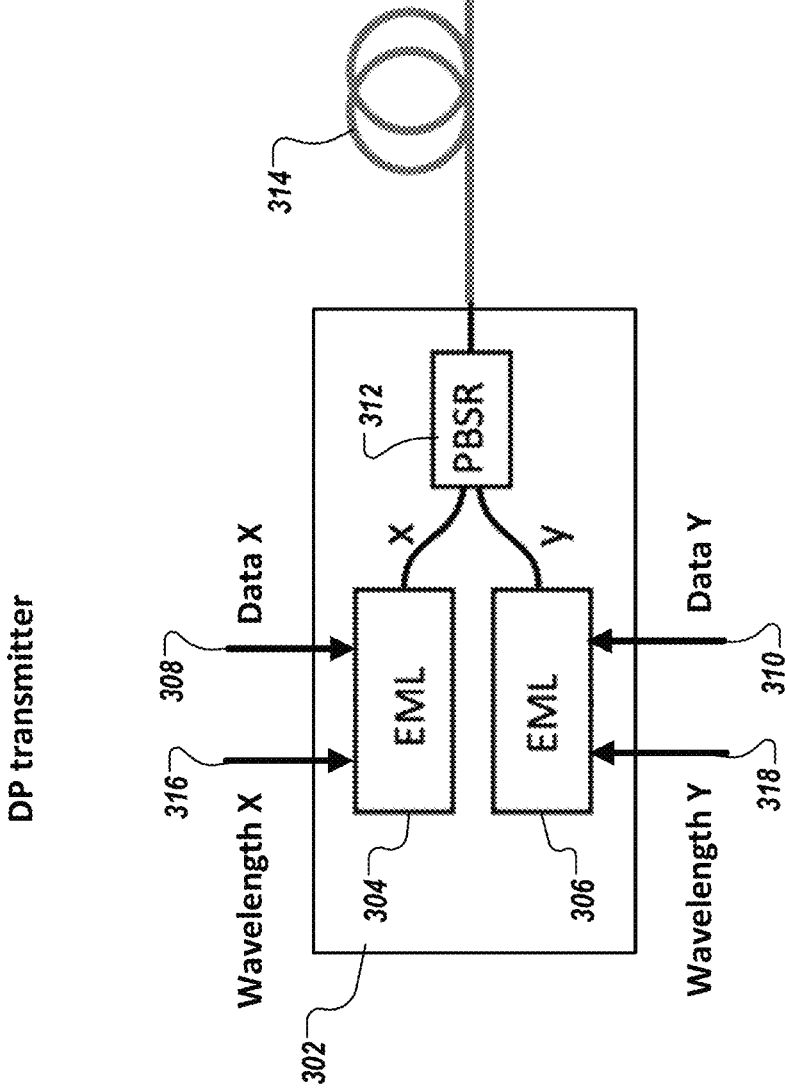
Figures 4A, 4B:
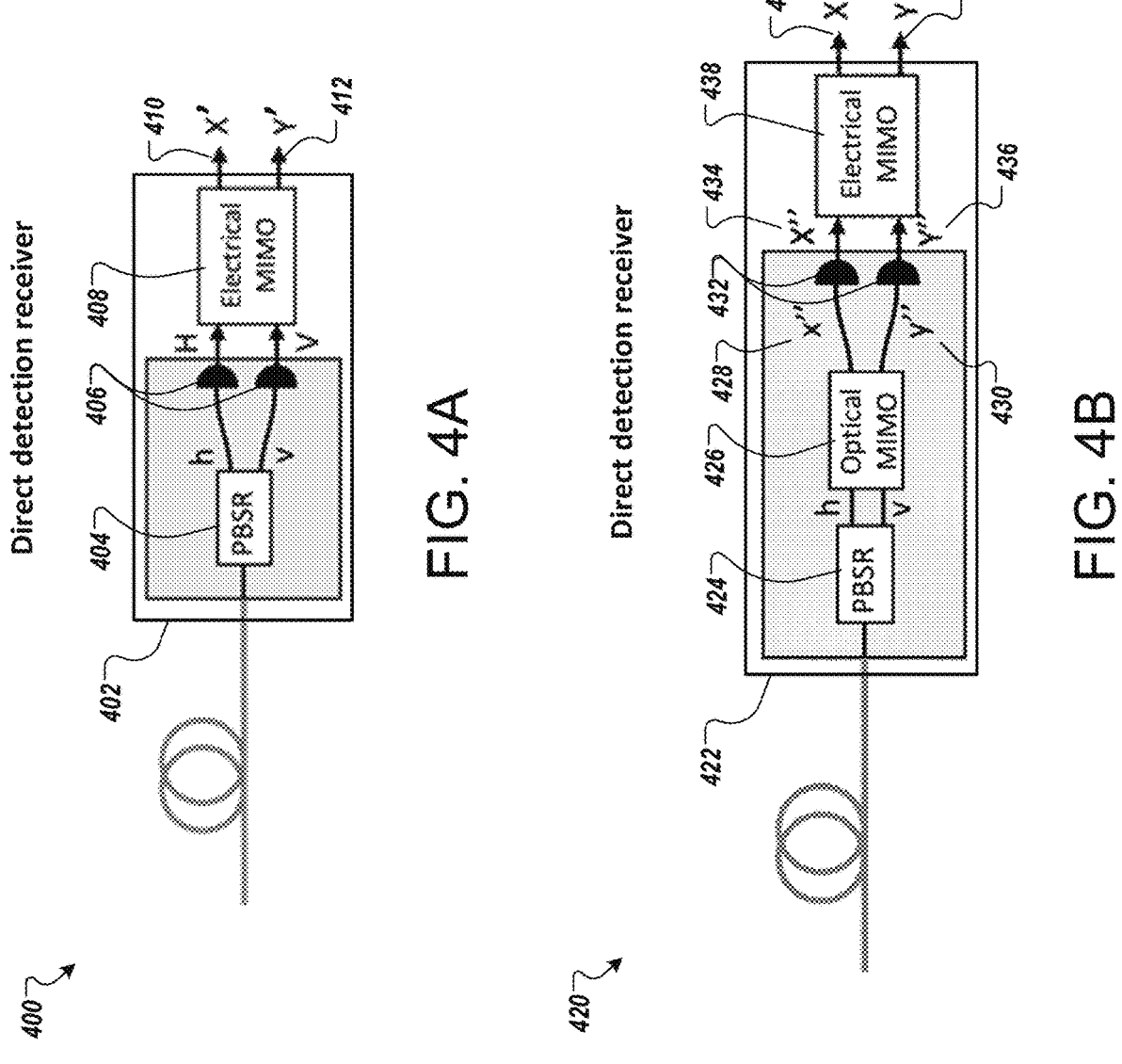
Figure 5:
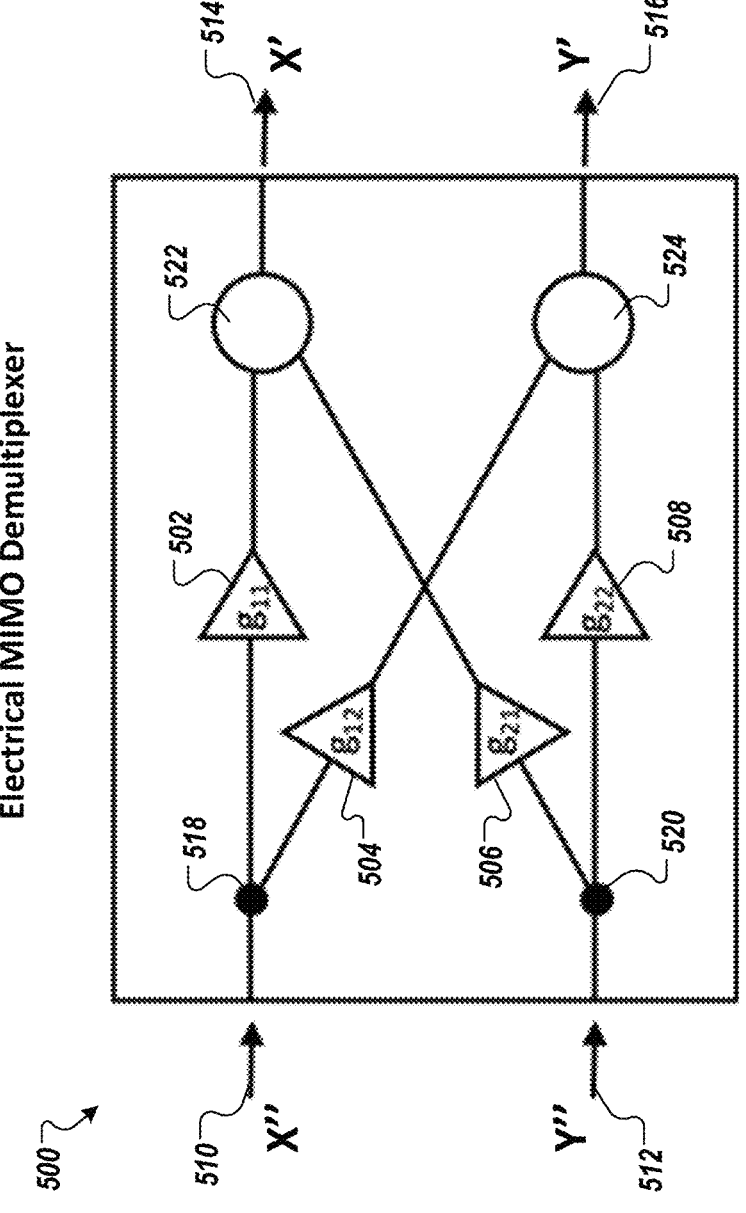
Figures 6A, 6B:
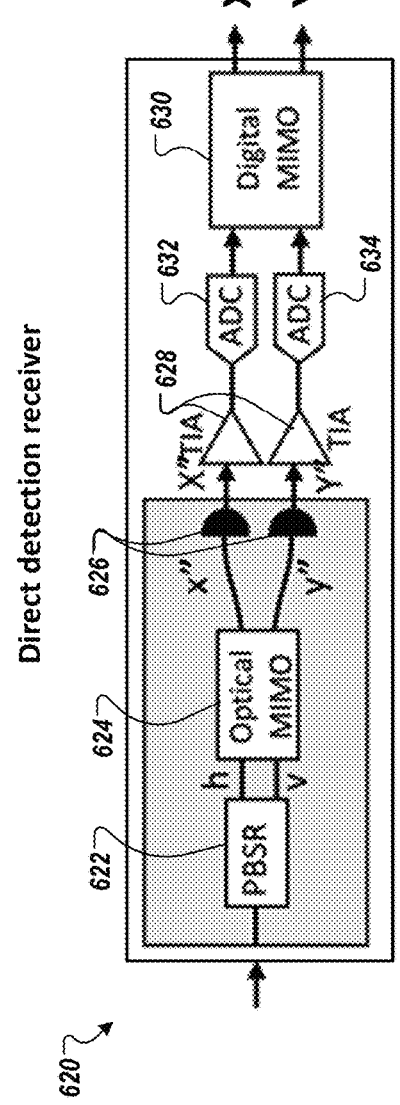
Figure 8:
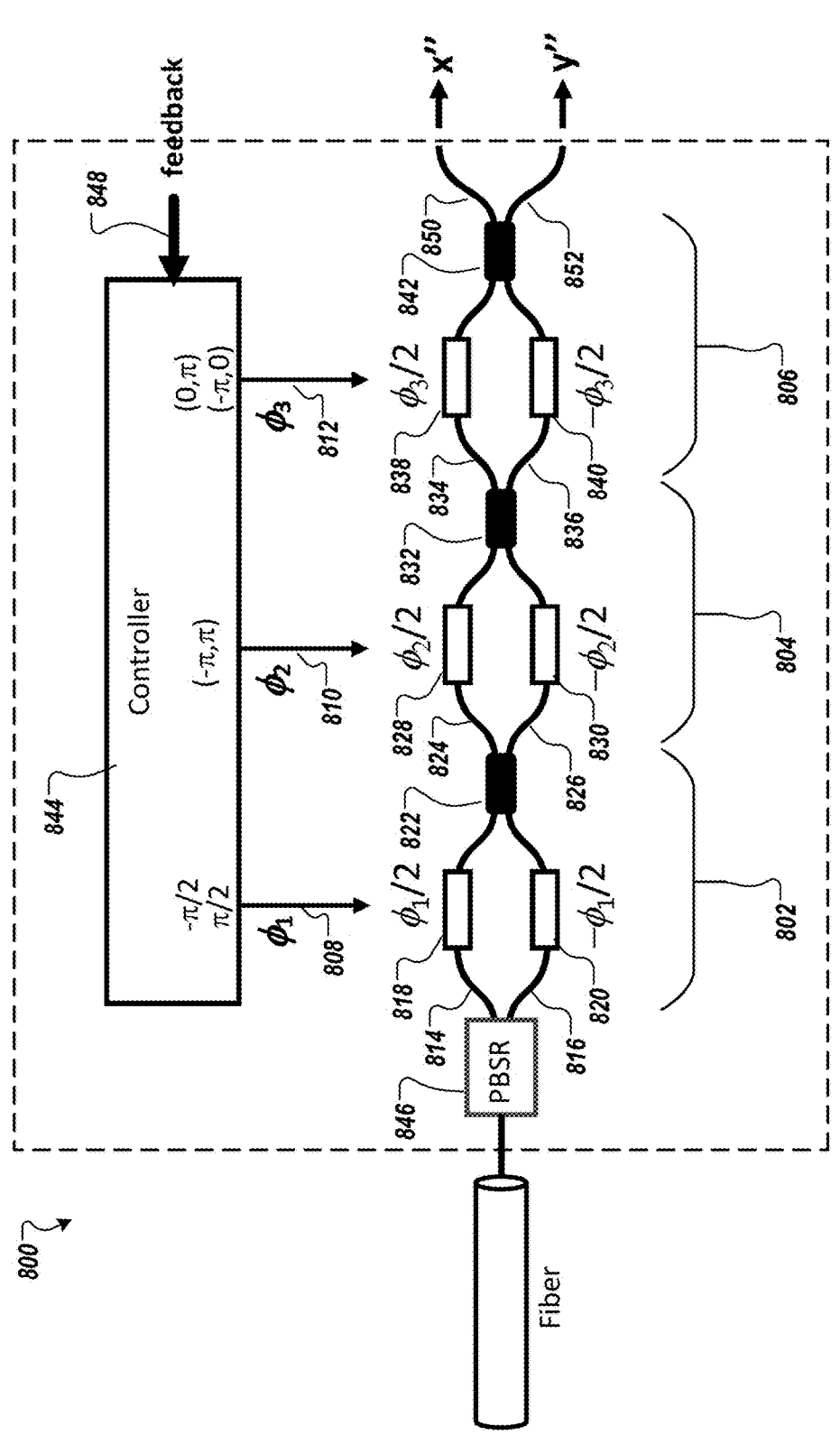

FIG. 3 illustrates an example of a DP transmitter with wavelength control for each laser;

FIG. 4A illustrates an example of a DP intensity modulated direct detection (IMDD) communication system that utilizes electrical multiple-input-multiple-output (MIMO) demultiplexing without any optical MIMO demultiplexing, according to implementations of the present disclosure;

FIG. 4B illustrates an example of a DP-IMDD communication system that utilizes a combination of electrical MIMO demultiplexing and optical MIMO demultiplexing according to implementations of the present disclosure;

FIG. 5 illustrates an example of an electrical MIMO demultiplexer according to implementations of the present disclosure;

FIGS. 6A and 6B illustrate different examples of receivers that utilize IMIDD with a combination of optical and electrical MIMO demultiplexing according to implementations of the present disclosure;

Figure 7:
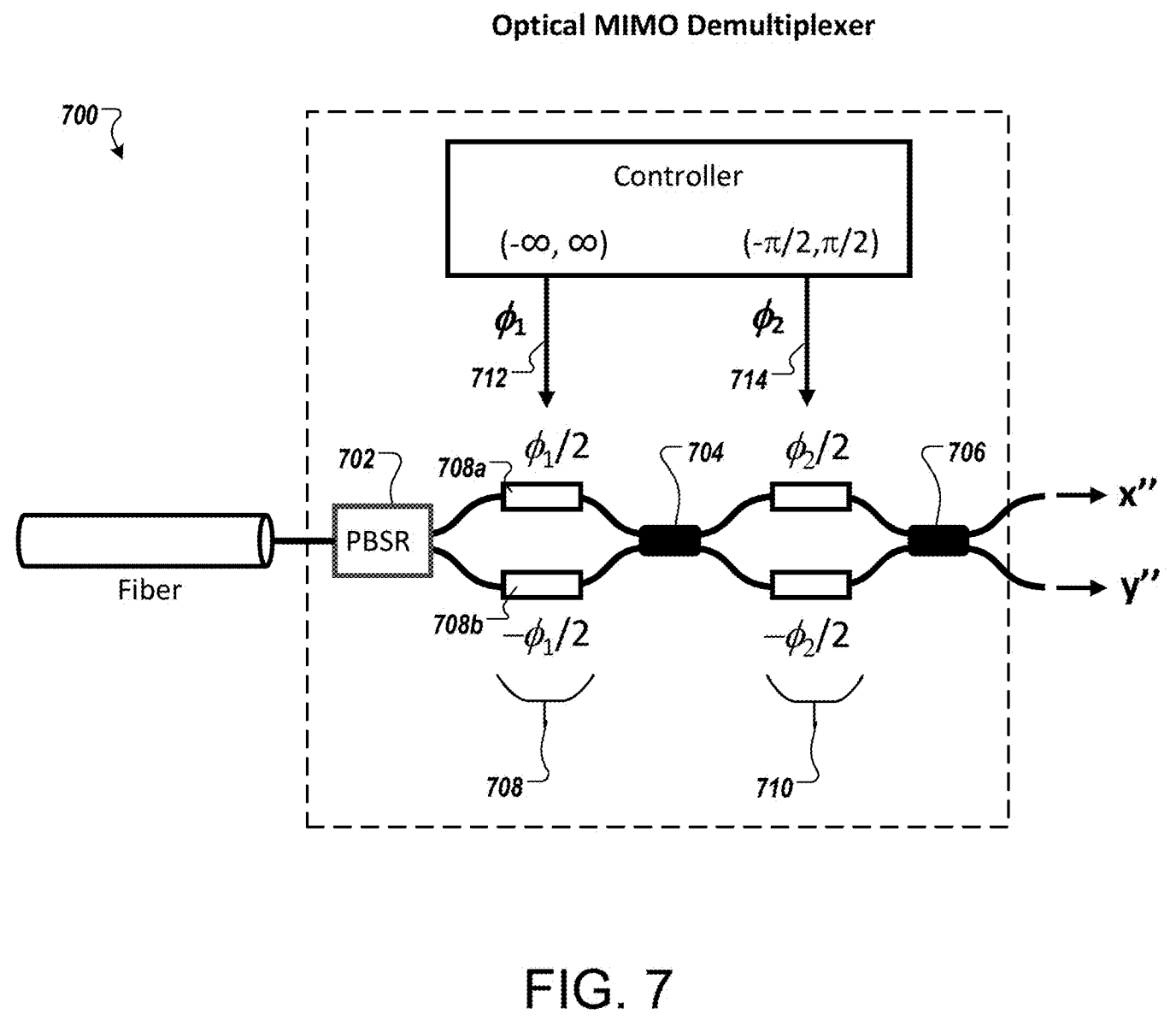

FIG. 7 illustrates an example of an optical MIMO polarization demultiplexer with two phase control signals; and FIG. 8 illustrates an example of an optical MIMO polarization demultiplexer with three phase control signals.

DETAILED DESCRIPTION

In general, multi-polarization detection is challenging because polarization states tend to drift as an optical waveform travels through a communication system (e.g., due to randomly changing birefringence in fiber transmission lines). Over a long-distance system, these random drifts of polarization can accumulate progressively without limit. In an optical communication system which uses polarization division multiplexing (PDM) to transmit different signals over the two polarization modes of light, the random and unknown polarization drifting creates challenges for a receiver to accurately detect the proper orientation of the two polarization modes, resulting in the two signals becoming mixed at the receiver (sometimes referred to as "crosstalk"). Hence, even though a signal is transmitted in one polarization mode, the signal may actually be received in both polarization modes at the receiver. In addition to polarization drift, other non-idealities in an optical communication system may degrade performance, such as polarization dependent loss (PDL), which amplifies or attenuates different polarization modes differently.

To compensate for polarization drift and other non-idealities, a multi-polarization receiver can perform adaptive MIMO demultiplexing to separate and unmix the signals that are transmitted in the two polarization modes. Such MIMO multiplexing may be performed either in the optical domain using optical phase shifters that operate directly on the received light signals, or in the electrical domain by processing electrical signals that result after photodetection of the optical signals. Optical MIMO demultiplexing and electrical MIMO demultiplexing each have relative advantages. For example, optical demultiplexing can reduce power consumption, complexity, and sensitivity to the symbol rate. However, in the presence of polarization-dependent loss (PDL), polarization-mode dispersion (PMD), imperfect polarization splitting extinction ratio, and imperfect optical polarization tracking, optical MIMO demultiplexing will generally have a finite crosstalk that ultimately limits detection performance. In fact, if the system is not unitary, then it can be impossible for an optical MIMO demultiplexer to perfectly demultiplex both outputs simultaneously, unless the optical MIMO demultiplexer implements variable optical attenuators, which increases complexity. In such scenarios, an electrical MIMO demultiplexer help efficiently remove this crosstalk for both output signals simultaneously.

In a dual-polarization (DP) communication systems, two signals are multiplexed and transmitted using two different polarization modes of light, thereby doubling the data capacity. At the receiver, detection can be performed by either coherent detection or direct detection. In coherent detection, a local oscillator laser is implemented at the receiver to mix with the two received signals thereby detecting both the magnitude and phase of the optical field in each signal. By contrast, in direct detection, the receiver detects only the magnitude of the optical field (via the optical power) without requiring a local oscillator. The relative simplicity of direct detection makes it an attractive alternative to coherent detection in many scenarios.

However, the simplicity of direct detection can also create challenges in the context of PDM communication systems (e.g., a DP communication system). For example, if intensity-modulated direct-detection (IMDD) is utilized in a DP system, then information is transmitted only in the magnitude squared of the optical electric field (e.g., using pulse amplitude modulation) in each of the two signals. When the two DP-IMDD signals are direct-detected by photodetectors at the receiver via IMDD, the optical field in a direct-detection receiver undergoes non-linear squaring effects, which can destroy the phase information in the two signals, preserving only their magnitudes. Therefore, it has generally been assumed that DP-IMDD systems require demultiplexing the two signals in the optical domain (before photodetection) with an optical demultiplexer. For these reasons, electrical demultiplexing has not been used in conjunction with direct detection in DP-IMDD systems.

According to implementations of the present disclosure, such limitations of electrical MIMO demultiplexers can be overcome by configuring the two signals in the two polarization modes of a DP system to have different carrier frequencies which are separated by a frequency difference that is large compared to the signal symbol rate. However, at the same time, this frequency separation should be small enough so that the two carrier frequencies do not experience significant differences in polarization rotation in the two signals. Such implementations are referred to throughout this disclosure as "non-overlapping" or "heterodyne" multiplexing.

At the receiver, the separation between carrier frequencies of the two received signals results in the beat frequency between the two signals in the photodetectors being outside the receiver bandwidth. This enables an electrical MIMO demultiplexer to be used for performing polarization demultiplexing of the two signals. In some implementations, the electrical MIMO demultiplexer can be used in combination with an optical MIMO demultiplexer, for example by using the optical MIMO demultiplexer to perform initial demultiplexing, and then using the electrical MIMO demultiplexer to perform additional demultiplexing to eliminate remnant crosstalk for the two output signals, resulting in very low crosstalk for both signals. As such, by implementing an appropriate frequency separation between the carrier frequencies of the two signals in the two polarization modes in a DP-IMDD system (also referred to herein as "heterodyne DP-IMDD"), a receiver can implement electrical MIMO demultiplexing to perform polarization demultiplexing of the two signals in a DP-IMDD system without necessarily being limited to using only purely optical MIMO demultiplexing.

Figure 1:
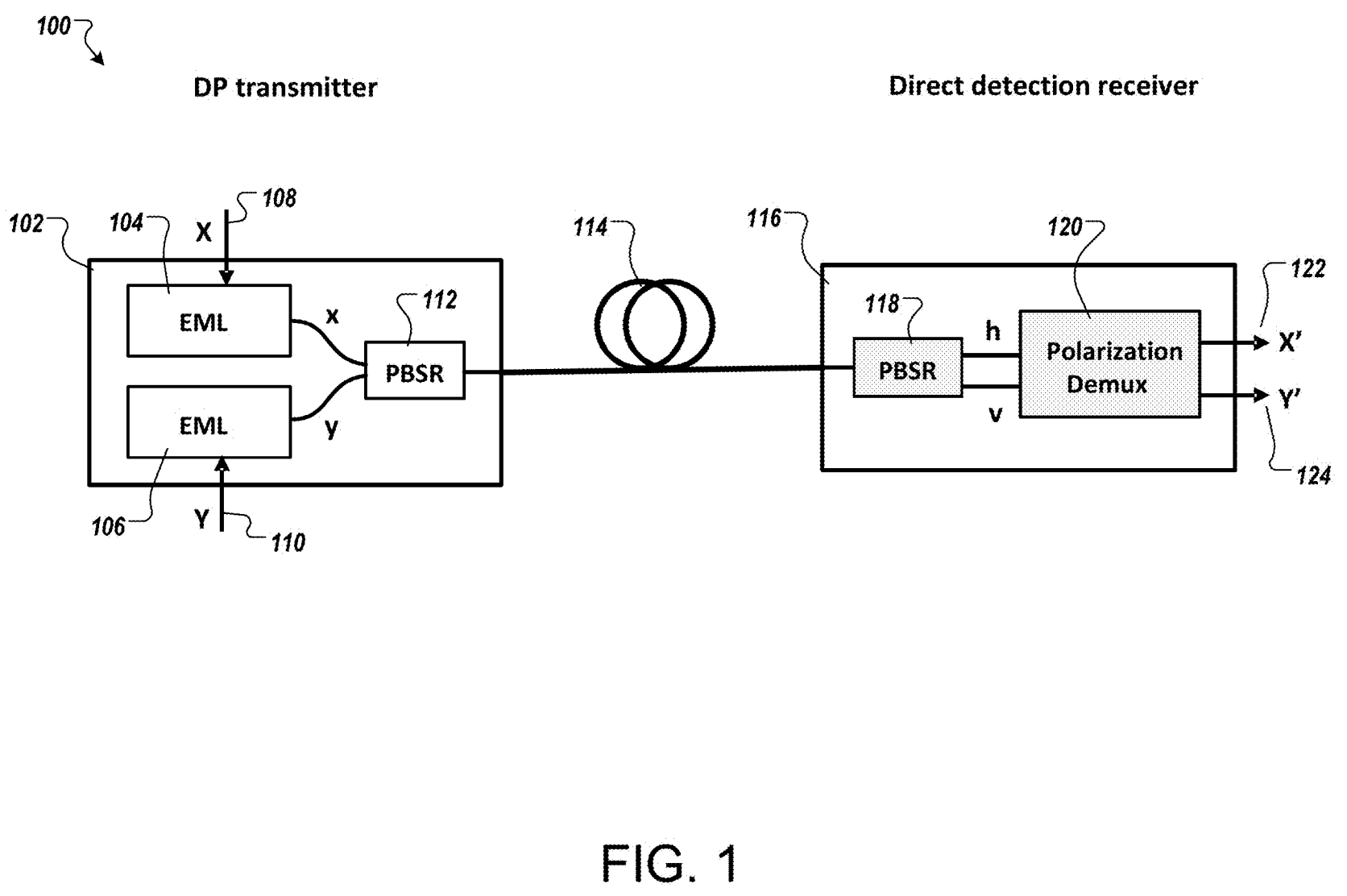

FIG. 1 illustrates an example of a DP communication system, according to implementations of the present disclosure.

The DP communication system 100 shown in FIG. 1 includes a transmitter 102 that implements two lasers 104 and 106, which can be electro-absorption modulated lasers (EMLs) that are modulated by two different data streams 108 and 110 to generate two different modulated light signals (x and y). Throughout this disclosure, lower-case letters represent complex numbers (e.g., field) and upper-case letters represent real numbers (e.g., power). The first EML 104 modulates the light in one optical transmission path with the first data stream 108 and the second EML 106 modulates the light in other optical transmission path with the second data stream 110. Although the example in FIG. 1 depicts EML-based transmitters, other transmitters such as directly modulated lasers (DMLs) or external modulated lasers (such as silicon-photonic modulators) can also be used.

The two modulated optical waveforms x and y are combined in a polarization beam splitter and rotator (PBSR) 112, which converts one of the optical waveforms into an orthogonal polarization. Throughout this disclosure, although examples are shown of a splitter implemented by a PBSR, other types of splitters can be used, including passive photonic integrated devices such as a polarization splitting grating coupler (PSGC). After the PBSR 112, the two optical waveforms x and y co-exist in the same optical transmission path but have orthogonal polarizations. This dual-polarized (DP) optical waveform travels through a fiber link 114. As the DP waveform travels through the fiber, various unknown and varying birefringence and twists in the fiber can cause changes in the polarizations of the two waveforms. If the fiber link 114 does not have significant polarization-dependent loss (PDL), then the two polarizations remain orthogonal. For example, x may evolve from a linear horizontal polarization to a right-hand circular polarization, which means that y evolves from a linear vertical polarization to a left-hand circular polarization. However, in the presence of PDL, the orthogonality of the polarizations in the DP optical waveform will degrade, which will complicate the demultiplexing of x and y.

At the receiver 116, the DP waveform enters a PBSR 118 which splits the DP waveform into two waveforms (h and v) which have orthogonal polarizations. Due to non-idealities in the optical communication system, the outputs of the PBSR 118 (h and v) are each a linear and orthogonal combination of x and y, plus additional noise.

The two signals h and v then enter a polarization MIMO demultiplexer 120 to extract estimates 122 and 124 (X' and Y') of the original signals X and Y from the received optical signals h and v. The polarization MIMO demultiplexer 120 can be implemented via electrical MIMO demultiplexing and/or via optical MIMO demultiplexing, as described in detail further below.

The polarization MIMO demultiplexer 120 implements direct detection (e.g., as part of an IMIDD system). As discussed above, in IMDD systems, the nonlinearity of photodetection can result in a loss of optical phase information, which can render it impossible to recover the original signals x and y. This is because when the received signals (h and v) are detected by photodetectors in the receiver 116, the optical field in a direct-detection receiver 116 undergoes non-linear squaring effects, which can destroy the phase information in the two signals h and v.

In particular, this loss of information in IMDD systems occurs when the two optical signals (e.g., x and y at the transmitter, and h and v at the receiver) in the two polarization modes have the same carrier frequency. This scenario is referred to herein as the "completely overlapping" or "homodyne" multiplexing scenario. In addition, this loss of information can also occur when the two carrier frequencies are separated with a frequency difference that is small compared to the signal symbol rate. This scenario is referred to herein as the "partially overlapping" or "intradyne" multiplexing scenarios. In both scenarios of homodyne and intradyne multiplexing, the relative phase between the two optical signals affects the photo-detected signals at the receiver, so that MIMO demultiplexing of the two polarizations must be performed in the optical domain, before photodetection.

However, if the two optical signals in the two polarization modes are configured with different carriers frequencies that are sufficiently separated so that the beat frequency between the two signals in the photodetectors is outside the receiver bandwidth (referred to herein as the "non-overlapping" or "heterodyne" multiplexing scenario), then photodetection followed by electrical MIMO demultiplexing is possible for DP-IMDD because the relative optical phase between the two signals does not matter and the signal beating is mostly incoherent while maintaining polarization orthogonality. Therefore, unlike the homodyne and intradyne multiplexing scenarios (which require the polarization demultiplexer 120 to perform multiplexing in the optical domain), the heterodyne multiplexing scenario allows the polarization demultiplexer 120 to implement electrical demultiplexing (either with or without additional optical demultiplexing) and still effectively perform demultiplexing of the optical signals h and v in the two polarization modes.

Figures 2A, 2B, 2C:
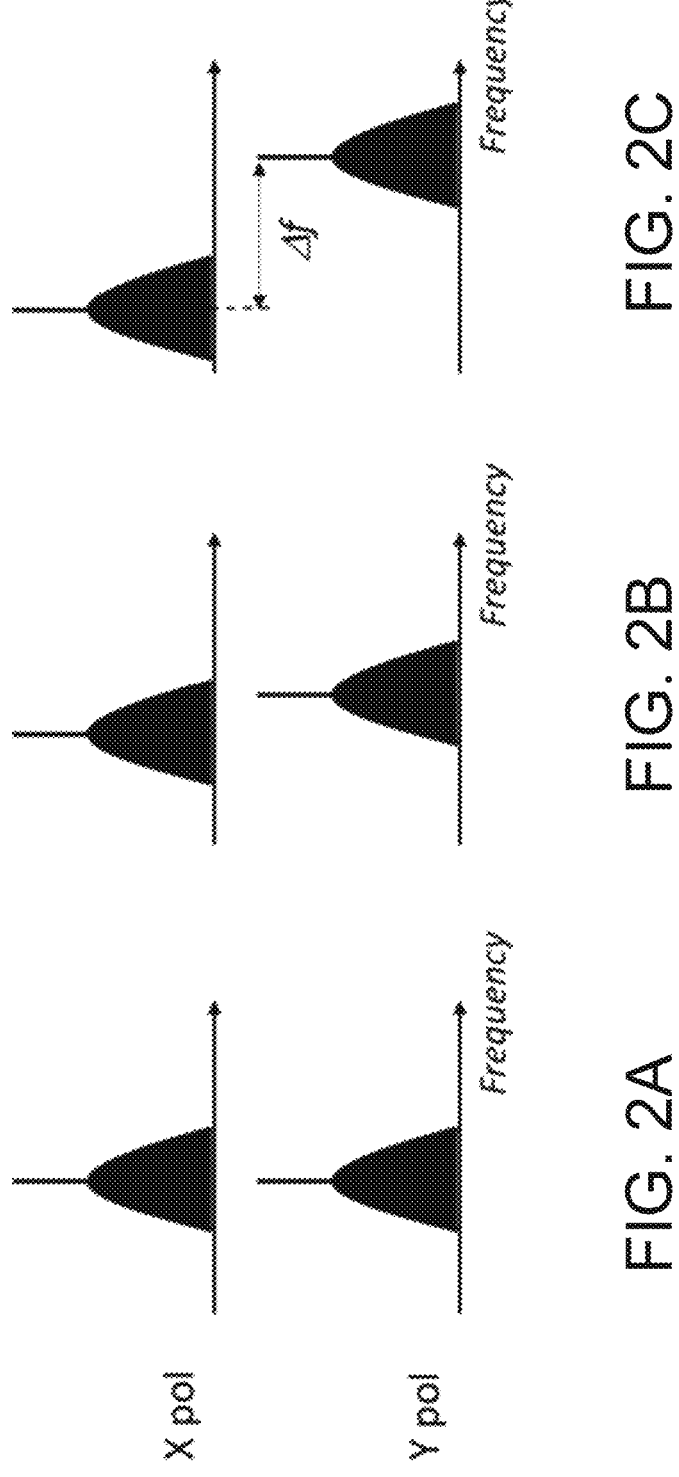
FIGS. 2A-2C illustrate examples of different types of multiplexing for DP signals, including fully-overlapping, partially-overlapping, and non-overlapping multiplexing of the two polarizations, according to implementations of the present disclosure.

FIGS. 2A-2C illustrate examples of different types of multiplexing for DP signals, including fully-overlapping, partially-overlapping, and non-overlapping multiplexing of the two polarizations, according to implementations of the present disclosure;

For a dual-polarization IMDD system, the two signals (x and y) in the two polarizations could have the same carrier frequency (referred to in this disclosure as the "fully-overlapping" or "homodyne" multiplexing scenario) as shown in the example of FIG. 2A, or different carrier frequencies wherein the frequency difference is small compared to the signal symbol rate (referred to in this disclosure as the "partially overlapping" or "intradyne" multiplexing scenario) as shown in the example of FIG. 2B, or different carrier frequencies wherein the frequency difference is large compared to the signal symbol rate (referred to in this disclosure as the "non-overlapping" or "heterodyne" multiplexing scenario) as shown in the example of FIG. 2C. In particular, for the heterodyne multiplexing of FIG. 2C, the frequency difference $\Delta f$ should be configured to allow the signal beating to be mostly incoherent yet maintain polarization orthogonality in the presence of PMD as much as possible. For example, in heterodyne multiplexing, the frequency difference should be large compared to the signal symbol rate but small enough so that the two carrier frequencies do not experience significant differences in phase/polarization shift in the two signals.

Implementations of the present disclosure are directed to the heterodyne (non-overlapping) multiplexing scenario and utilizing electrical MIMO demultiplexers to demultiplex signals in a DP-IMDD communication system. The separation between carrier frequencies of the two optical signals in a heterodyne DP-IMDD system enables an electrical MIMO demultiplexer to be used for performing polarization demultiplexing of the two signals. In some implementations, the electrical MIMO demultiplexer can be used in combination with an optical MIMO demultiplexer, for example by using the optical MIMO demultiplexer to perform initial demultiplexing, and then using the electrical MIMO demultiplexer to perform additional demultiplexing to eliminate remnant crosstalk for the two output signals, resulting in very low crosstalk for both signals.

FIG. 3 illustrates an example of a DP transmitter with wavelength control for each laser. The DP transmitter in this example can be utilized to generate heterodyne-multiplexed DP signals. In particular, the example of FIG. 3 shows a partial view of a DP communication system 300 in which a DP transmitter 302 includes two lasers 304 and 306, such as electro-absorption modulated lasers (EMLs), to generate two different light signals in the two polarization modes which carry different data streams. The two lasers 304 and 306 can have wavelengths that are preset to certain values and the spacing between two wavelengths can be controlled to be larger than a spacing threshold. The wavelength control of a laser source is dependent on the laser implementation, such as the grating period, cavity length, drive current, and laser temperature. The wavelength of a laser can be configured by changing the grating pitch or cavity length, or by changing the drive current or laser temperature. Implementations of this disclosure are not limited to a particular wavelength control scheme. Furthermore, although the example in FIG. 3 depicts EML-based transmitters, other transmitters such as directly modulated lasers (DMLs) or external modulated lasers (such as silicon-photonic modulators) can also be used.

In the example of FIG. 3, the lasers 304 and 306 are wavelength-controlled, so that the wavelengths 316 and 318 of the two lasers can be configured and adjusted. In the heterodyne (non-overlapping) multiplexing scenario, the two wavelengths 316 and 318 are configured such that the two signals x and y in the two polarization modes have different carrier frequencies which are separated by a frequency difference that is large compared to the signal symbol rate and yet small enough to avoid significant differences in phase/polarization shift in the two signals. As discussed above, this heterodyne multiplexing scenario enables an electrical MIMO demultiplexer to be used at a receiver to demultiplex the DP-IMDD signals. Further details of electrical MIMO demultiplexing at the receiver is discussed next.

FIG. 4A illustrates an example of a DP-IMDD communication system that utilizes electrical MIMO demultiplexing without any optical MIMO demultiplexing, according to implementations of the present disclosure. The example of FIG. 4A shows a partial view of a DP communication system 400 in which a direct detection receiver 402 is configured to receive and demultiplex DP-IMDD signals that are heterodyne-multiplexed (i.e., where the two received optical signals h and v in the two polarization modes have different carrier frequencies separated by a frequency difference that is large compared to the signal symbol rate). At the receiver 402, the DP waveform enters a PBSR 404 which splits the DP waveform into two optical waveforms (h and v) that have orthogonal polarizations. Due to the non-idealities in the optical communication system, the optical outputs of the PBSR 404 (h and v) are each a linear and orthogonal combination of the originally transmitted optical signals x and y. As an example, h is a linear combination of x and y, and similarly v is a linear combination of x and y. For example, $h=(x-y)/sqrt(2)$ and $v=(x+y)/sqrt(2)$. More precisely, the received signals h and v will be noisy versions of x and y due to additive noise in the system, but we will assume a noiseless scenario for the purposes of this discussion.

The two received optical signals h and v are photodetected by photodetectors 406 and the resulting electrical signals (H and V) are input into an electrical MIMO demultiplexer 408 which performs electrical demultiplexing to separate signals X' and Y' (410 and 412). As discussed above, electrical MIMO demultiplexing is feasible in the heterodyne-multiplexed scenario due to the sufficient frequency separation between the carrier frequencies of the two optical signals. Electrical polarization demultiplexing can provide various technical benefits, such as extremely fast polarization tracking, no incurred optical losses from an optical polarization demultiplexer, and facile compensation of polarization-dependent loss (PDL) and polarization-mode dispersion (PMD).

However, it should be noted that in some scenarios, the electrical MIMO demultiplexing implementation of FIG. 4A requires that h contains substantially unequal portions of x and y and likewise that v contains significantly unequal portions of x and y. If h contains equal portions of x and y and likewise v contains equal portions of x and y, the electronic demultiplexing becomes impossible. To avoid such scenarios, a combination of electrical MIMO demultiplexing and optical MIMO demultiplexing can be used to demultiplex heterodyne DP-IMDD, as described next.

FIG. 4B illustrates an example of a DP-IMDD communication system that utilizes a combination of electrical MIMO demultiplexing and optical MIMO demultiplexing, according to implementations of the present disclosure. The example of FIG. 4B shows a partial view of a DP communication system 420 in which a direct detection receiver 422 is configured to receive and demultiplex DP-IMDD signals that are heterodyne-multiplexed.

In the direct detection receiver 422, the DP waveform enters a PBSR 424 which splits the DP waveform into two waveforms, h and v, which have orthogonal polarizations. The two optical signals h and v are then directly input to an optical MIMO demultiplexer 426, which performs an initial step of demultiplexing in the optical domain to output optical signals x"and y" (428 and 430). The optical signals x"and y" (428 and 430) may be demultiplexed to some extent as a result of the optical MIMO demultiplexer 426, but still may have some residual crosstalk between the two signals. In other words, the optical MIMO can be used to guarantee that h contains significantly different portions of x and y, and likewise v contains significantly different portions of x and y. For example, in the presence of polarization-dependent loss (PDL), polarization-mode dispersion (PMD), imperfect polarization splitting extinction ratio, and/or imperfect optical polarization tracking, the optical MIMO demultiplexer 426 can result in a finite amount of crosstalk between the optical signals x"and y" (428 and 430) which degrades detection performance. For example, if the system is not unitary, then can be impossible for the optical MIMO demultiplexer 426 to completely demultiplex both outputs x"and y" (428 and 430) simultaneously, unless the optical MIMO demultiplexer 426 includes variable optical attenuators, which increases complexity. The optical MIMO demultiplexer is preferably endless.

Therefore, as discussed above, in some scenarios the optical 2×2 MIMO demultiplexer can, at times, provide only partial demultiplexing for one or both of the pair of the optical signals that are output from the optical 2×2 MIMO demultiplexer. To account for this residual crosstalk between the optical signals x" and y" (428 and 420), the electrical MIMO demultiplexer 438 performs a subsequent step of demultiplexing in the electrical domain to remove this residual crosstalk for both outputs simultaneously, resulting in very low crosstalk for both signals. In particular, the optical signals x" and y" (428 and 430) that are output from the optical MIMO demultiplexer 426 are photodetected by photodetectors 432, resulting in electrical signals X" and Y" (434 and 436) representing the power of the respective optical fields. The electrical signals X" and Y" (434 and 436) are then input to an electrical MIMO demultiplexer 438 which performs demultiplexing in the electrical domain to separate signals X' and Y' (440 and 442). Such two-stage demultiplexing can provide various advantages. For example, even if the optical MIMO demultiplexing is partial (e.g., imperfect optical MIMO demultiplexing), the subsequent step of electrical MIMO demultiplexing can serve to clean up the signal (e.g., remove residual crosstalk from the outputs of the optical MIMO demultiplexing).

As discussed above, electrical MIMO demultiplexing is possible in the heterodyne multiplexed DP-IMDD scenario because the beat frequency between the two signals in the photodetectors is outside the receiver bandwidth. As such, a combination of electrical MIMO demultiplexing and optical MIMO demultiplexing as shown in the example of FIG. 4B can be used to efficiently perform demultiplexing and remove crosstalk, with relatively low complexity (e.g., without necessarily having to implement variable optical attenuators in the optical MIMO demultiplexer 426).

Next, FIGS. 5-8 present various examples of MIMO demultiplexers, including electrical MIMO demultiplexers (in FIGS. 5, 6A, and 6B) and optical MIMO demultiplexers (in FIGS. 7 and 8). In all of these examples, the MIMO demultiplexers attempt to separate the two received signals into the two different polarization modes, and therefore recover the original signals x and y. For two orthogonal states of polarization, a DP optical communication system can be represented as a 2×2 Multi-Input-Multi-Output (MIMO) channel. Thus, the optical transmission can be modeled as a 2×2 matrix, F. The matrix F is a transfer function describing polarization effects and chromatic dispersion of the communication from transmitter to receiver. For example, the matrix F can model the effects of the fiber that connects a transmitter and receiver, as well as the effects of the optical components in the transmitter and receiver themselves. For purposes of this disclosure, the matrix F will be referred to as a "channel matrix F" with the understanding that the "channel" can represent various effects of the optical communication system, such as the fiber transmission line and components of the transmitter and/or receiver.

$$\begin{bmatrix} h \\ v \end{bmatrix} = F \begin{bmatrix} x \\ y \end{bmatrix}$$

To estimate the original signals x and y from the received signals h and v, an optical demultiplexer D is applied at the receiver, to generate estimates x' and y':

$$\begin{bmatrix} x' \\ y' \end{bmatrix} = DF \begin{bmatrix} x \\ y \end{bmatrix}$$

Then, as long as x'=ax and y'=bx (where "a" and "b" are complex constants), then the receiver will have successfully demultiplexed the polarizations.

FIG. 5 illustrates an example of an electrical MIMO polarization demultiplexer according to implementations of the present disclosure. The example electrical MIMO demultiplexer 500 of FIG. 5 can be utilized to implement the electrical MIMO demultiplexers 408 and 438 of FIGS. 4A and 4B.

The electrical 2×2 MIMO demultiplexer 500 can be implemented using various techniques, such as a "butterfly" network with variable gain elements (502, 504, 506, and 508) as shown in FIG. 5. The gain values g11, g12, g21, and g22 can be positive or negative and must be adjusted continuously due to polarization changes from the fiber link. In some implementations, the adjustment of the gain values can be performed with control feedback, which can be obtained from markers (e.g., tone signals) placed on the signals at the transmitter that are detected by the electronics at the receiver after the demultiplexing, maximization of eye opening, minimization of bit-error count, or other known signal quality monitoring techniques.

The 2×2 electrical MIMO demultiplexer 500 is a "butterfly" network and consists of two inputs (510 and 512) and two outputs (514 and 516). Each of the input signals 510 and 512 is split into two copies by splitters 518 and 520. Each copy proceeds through an amplifier/attenuator with a controllable gain, which could be positive or negative (inverting). For example, the first copy of signal 510 experiences gain g11 (through gain element 502) and the second copy of signal 510 experiences gain g12 (through gain element 504), while the first copy of signal 512 experiences gain g21 (through gain element 506), and the second copy of signal 512 experiences gain g22 (through gain element 508). The output of the gain element 502 with gain value g11 is added to the output from the gain element 506 with gain value g21 by summing element 522, and the result is sent to output 514. Similarly, the output of the gain element 504 with gain value g12 is added to the output of the gain element 508 with gain value g22 by summing element 524, and the result is sent to output 516.

In some implementations of the present disclosure, the gain values are configured such that $|g12| \ll |g11|$ and $|g21| \ll |g22|$. Also, the sign of g12 would be opposite that of g11 and the sign of g21 would be opposite that of g22. Furthermore, in some implementations, the gain values g11 and g22 are fixed, and only the gain values g12 and g21 are adjusted while tracking the polarization of the received signals. For example, in some implementations, g11 is equal to 1, g22 is equal to 1, g12 is in a range of values −0.25 to 0.0, and g21 is in a range of values −0.25 to 0.0. In some implementations, the gain value g21 is adjusted to maximize the signal quality or minimize the unwanted tone marker in output 514, and the gain value g12 is adjusted to maximize the signal quality or minimize the unwanted tone marker in output 516. In some implementations, taps can be implemented with different time delays and gains. This would allow the creation of frequency-dependent gains.

FIGS. 6A and 6B illustrate examples of receivers that utilize IMDD with a combination of electrical MIMO demultiplexing and optical MIMO demultiplexing, according to implementations of the present disclosure. In particular, the examples of FIGS. 6A and 6B show examples of different locations for the electrical MIMO demultiplexing with an analog implementation (FIG. 6A) and with a digital implementation (FIG. 6B).

In the example direct detection receivers 600 and 620 of FIGS. 6A and 6B, the DP waveform enters a PBSR (602 and 622) which splits the DP waveform into two waveforms, h and v, which have orthogonal polarizations. The two optical signals h and v are then directly input to an optical MIMO demultiplexer (604 and 624), which performs an initial step of optical MIMO demultiplexing to output optical signals x″ and y″. The optical signals x″ and y″ are photodetected by photodetectors (606 and 626), resulting in electrical signals X″ and Y″ which can be amplified by transimpedance amplifiers (TIAs 608 and 628). At this point, the amplified electrical signals X″ and Y″ (which are analog) can be either directly processed by an analog electrical MIMO demultiplexer (as in FIG. 6A) or converted into the digital domain and processed by a digital electrical MIMO demultiplexer (as in FIG. 6B).

In the example of FIG. 6A, the amplified electrical signals X″ and Y″ are processed by an analog electrical MIMO demultiplexer 610, and then converted into the digital domain by analog-to-digital converters (ADC 612 and 614). As such, the electrical MIMO demultiplexer 610 performs analog-domain demultiplexing to separate signals X′ and Y′ as outputs. An advantage of doing the electrical MIMO demultiplexing in the analog portion is that the digital PHY can be a conventional digital IMDD PHY.

In the example of FIG. 6B, the amplified electrical signals X″ and Y″ are first converted into the digital domain by analog-to-digital converters (ADC 632 and 634) and then processed by a digital electrical MIMO demultiplexer 630. As such, the electrical MIMO demultiplexer 630 performs digital domain demultiplexing to separate signals X′ and Y′ as outputs. Some advantages of electrical MIMO demultiplexing in the digital portion include more flexibility in the design, ease of implementing more taps with different time delays (e.g., to compensate PMD), and more opportunities to enhance performance.

Next, examples of optical MIMO demultiplexers are described with reference to FIGS. 7 and 8. In some implementations, these optical MIMO demultiplexers can be used in conjunction with electrical MIMO demultiplexers, as discussed above in the examples of optical MIMO demultiplexers 426, 604, and 624 in FIGS. 4B, 6A, and 6B.

FIG. 7 illustrates an example of an optical MIMO polarization demultiplexer with two control signals. Demultiplexer 700 consists of a polarization splitter and rotator (PBSR) 702, two 50/50 couplers 704 and 706, and two phase shifters 708 and 710 (e.g., differential phase shifters). The two phase shifters 708 and 710 are controlled by separate control signals $\varphi_1$ (712) and $\varphi_2$ (714). In the example of FIG. 7, each of the phase shifters 708 and 710 is a differential phase shifter. For example, phase shifter 708 is implemented as an interferometer with two individual phase shifting elements (708a and 708b) that adjust the optical phase in one direction in one arm of the interferometer and adjusts the optical phase in the opposite direction in the other arm. A similar structure is shown for phase shifter 710. Alternatively, in some implementations, each of the phase shifters 708 and 710 can be implemented as a non-differential phase shifter with just one phase shifting element in a single arm. The differential implementations shown in FIG. 7 has several advantages over a non-differential implementations. For example, the differential implementation has an advantage of requiring a smaller range per phase shifter. Furthermore, for a thermo-optic phase shifter, a differential phase shifter has half the worst-case power consumption as compared to a single phase shifter, and also has the benefit of constant total power consumption, which mitigates thermal transients. For purposes of this disclosure, a differential phase shifter (e.g., phase shifter 708) is considered as one phase shifter, with the understanding that it is implemented with two phase shifters (e.g., phase shifting elements 708a and 708b) but one control signal (e.g., $\varphi_1$, 712).

With this structure, the demultiplexer 700 can be represented as a matrix D (using the Mueller notation for polarization).

$$D = \begin{bmatrix} j\sin\frac{\phi_2}{2} & j\cos\frac{\phi_2}{2} \\ j\cos\frac{\phi_2}{2} & -j\sin\frac{\phi_2}{2} \end{bmatrix} \begin{bmatrix} e^{\frac{j\phi_1}{2}} & 0 \\ 0 & e^{\frac{-j\phi_1}{2}} \end{bmatrix}$$

However, the configuration of optical demultiplexer 700 in FIG. 7 has a limitation in that if the randomly drifting phase caused by the optical fiber requires that the phase control $\varphi_1$ (712) continuously increases, then at some point, due to the input limitations on $\varphi_1$, the phase shifter 708 must be reduced by $2\pi$ (so-called "reset"). However, during this reset, the reception of signals must be interrupted, resulting in possible loss of data and a potentially significant error burst in high-rate communications. To address this problem, a demultiplexer can implement more than two stages of phase shifters.

FIG. 8 illustrates another example of an optical MIMO polarization demultiplexer. The demultiplexer 800 can be implemented as part of a direct detection receiver. In some implementations, demultiplexer 800 is implemented via integrated photonics which can reduce cost compared to bulk optics.

The demultiplexer 800 includes three stages (802, 804, and 806) of phase shifting. Each stage is controlled by a phase shift control signal. For example, the first stage 802 is controlled by a first control signal 808, the second stage 804 is controlled by a second control signal 810, and the third stage 806 is controlled by a third control signal 812. Each control signal controls the amount of phase shift that is implemented in the respective phase shifting stage.

In the example of FIG. 8, each stage has a phase shifter and a 2×2 coupler that operate on a pair of optical transmission paths. For example, the first stage 802 has pair of transmission paths 814 and 816, optical phase shifting elements 818 and 820 (together forming a differential phase shifter), and a 2×2 coupler 822. Similarly, the second stage 804 has a pair of transmission paths 824 and 826, optical phase shifting elements 828 and 830 (together forming a differential phase shifter), and a 2×2 coupler 832. Finally, the third stage 806 has a pair of transmission paths 834 and 836, optical phase shifting elements 838 and 840 (together forming a differential phase shifter), and a 2×2 coupler 842. The 2×2 couplers in this disclosure can be, for example, implemented by directional couplers, multi-mode interference couplers, or adiabatic couplers.

Although the example of FIG. 8 shows differential implementations of phase shifters, some implementations may use non-differential implementations with just one optical phase shifting element (in one transmission path) in a stage. Throughout this disclosure, the phase difference between the two optical transmission paths (in a stage) is referred to simply as "$\varphi$," regardless of whether the phase shift is implemented by a differential phase shifter (i.e., each phase shifting element in the differential pair designed to shift by +/−$\varphi$/2, as shown in the example of FIG. 8) or implemented by a non-differential phase shifter (which shifts the phase of light in just one transmission path by an amount +/−$\varphi$ relative to light in the other transmission path). As such, the term "phase shifter" can apply to a differential phase shifter or to a non-differential phase shifter.

The phase shifters can be thermo-optic (thermo-optic phase shifter, TOPS), electro-optic (electro-optic phase shifter, EOPS), or other types. The TOPS generally have the slowest response time but can be sped up by covering with metal and/or shortening the distance to the heat sink. The power consumption of the TOPS can be reduced by having the optical transmission path pass through the heated region multiple times. The EOPS can operate on, for example, current injection, carrier depletion, or the Pockels effect. Each phase shifter could consist of multiple sections, such as a section with a phase shifter type that has a fast response time but more power consumption and a section with a phase shifter type that has a slow response time but reduced power consumption.

The three stages (802, 804, 806) of demultiplexer 800 are controlled within specific ranges or values of operations in a coordinated manner, so as to ensure that the demultiplexer 800 can achieve an "endless" property of demultiplexing without requiring a reset of any of the phase shifters. In particular, in the example of FIG. 8, the first control signal $\varphi_1$ for the first stage 802 is digital, with a value of either $-\pi/2$ or $+\pi/2$. The second control signal $\varphi_2$ for the second stage 804 can be analog or digital, operating over a continuous or discrete set of values between $-\pi$ and $+\pi$. The third control signal $\varphi_3$ for the third stage 806 can be analog or digital, operating over a continuous or discrete set of values within a range that depends on the first control signal $\varphi_1$, namely operating between 0 and $+\pi$ when $\varphi_1$ is $-\pi/2$ and operating between $-\pi$ and 0 when $\varphi_1$ is $+\pi/2$.

During operation of the demultiplexer 800, light that has traveled through a fiber first enters the splitter, such as PBSR 846, which splits the input light into the two optical transmission paths 814 and 816. The PBSR splits the input light into two polarizations and rotates one of the polarizations so that both outputs of the PBSR are in the same polarization. Thus, although path 814 contains light that was in one polarization when it entered the PBSR and path 816 contains light that was in the orthogonal polarization when it entered the PBSR, once in paths 814 and 816, the light in both paths 814 and 816 are in the same polarization. Although the example of FIG. 8 shows the splitter implemented by PBSR 846, other types of splitters can be used, including passive photonic integrated devices such as a polarization splitting grating coupler (PSGC).

The split input light enters the two optical transmission paths 814 and 816 of the first stage 802 and undergo relative phase shifts through phase shifting elements 818 and 820, such that light in one optical transmission path is phase-shifted by an amount $\varphi_1$ relative to light in the other optical transmission path. The amount of this relative phase shift $\varphi_1$ is controlled by the control signal 808. The phase-shifted light in the two optical transmission paths then enter a 2×2 coupler 822 which combines the relative phase-shifted light. This process repeats through the second stage 804 and the third stage 806, undergoing different phase shifts controlled by control signals $\varphi_2$ (810) and $\varphi_3$ (812).

A controller 844 controls the amount of relative phase shift in the three stages 802, 804, and 806 via the control signals 808, 810, and 812. In scenarios of closed-loop feedback, this control can be based on feedback information 848 which can be, for example, a measurement of an error in the received signal. Although FIG. 8 shows the controller 844 as part of the demultiplexer 800, in some implementations, the controller 844 may be implemented separately in a receiver.

An example of a specific algorithm that can be used by the controller 844 for controlling and coordinating the control signals 808, 810, and 812 will be described next. This algorithm can be used to control relative phase shifts in the demultiplexer 800.

First, light is received through a pair of MIMO inputs into a first pair of optical transmission paths (814, 816). A first optical phase shifter (e.g., differential phase shifter formed by 818 and 820) is controlled to apply a first relative phase shift between the first pair of optical transmission paths (814, 816). In some implementations, the first optical phase shifter can be controlled in a binary manner, for example with values $(c+\pi/2)$ and $(c-\pi/2)$, where "c" is a real number reflecting an offset. This control can be based on feedback information (e.g., using pilot tones).

Then, the first pair of optical transmission paths (814, 816) is combined with a first 2×2 optical coupler (822) to output a second pair of optical transmission paths (824, 826). A second optical phase shifter (e.g., differential phase shifter formed by 828 and 830) is controlled to apply a second relative phase shift between the second pair of optical transmission paths (824, 826). In some implementations, the second optical phase shifter can be controlled within a finite range of values that includes $-n\pi$ and $+n\pi$, where "n" is an integer. For example, this can be by analog operation within a range $(-n\pi, +n\pi)$. This control can be based on feedback information (e.g., using pilot tones).

Then, the second pair of optical transmission paths (824, 826) is combined with a second 2×2 optical coupler (832) to output a third pair of optical transmission paths (834, 836). A third optical phase shifter (e.g., differential phase shifter formed by 838 and 840) is controlled to apply a third relative phase shift between the third pair of optical transmission paths (834, 836). In some implementations, the third optical phase shifter can be controlled within a finite range that depends on the value of the first relative phase shift. For example, as described above, the third optical phase shifter can be controlled to operate between 0 and $+n\pi$ if the first relative phase shift is equal to $(c-\pi/2)$, and to operate between $-n\pi$ and 0 if the first relative phase shift is equal to $(c+\pi/2)$, where "n" is an integer. This can be done by analog operation within the ranges $(0, +n\pi)$ and $(-n\pi, 0)$. This control can be based on feedback information (e.g., using pilot tones).

Then, the third pair of optical transmission paths (834, 836) is combined with a third 2×2 optical coupler (842) to output a fourth pair of optical transmission paths (850, 852). The fourth pair of optical transmission paths (850, 852) is then output through a pair of MIMO outputs 350. In some implementations, these outputs (x" and y") can be input to photodetectors and subsequently processed through electrical MIMO demultiplexing, as shown in the examples of FIGS. 4B, 6A, and 6B.

Although this algorithm was described as a specific ordering of steps, one or more of these steps can be performed in a different order. For example, the control of the first, second, and third optical phase shifters can be performed in a different order.

Through such phase-shifting algorithms, demultiplexer 800 is able to compensate for random birefringence changes which rotate the polarizations of light, caused by distortions introduced by the optical communication system. In addition to compensating for phase shifts, a demultiplexer can also be designed to compensate for other non-idealities, such as polarization dependent loss (PDL). In general, PDL may be caused by the fiber line itself, or by other elements of the communication system, such as fiber connectors, isolators, amplifiers, splitters, fiber couplers, or PBSRs. While PDL may be negligible in most short fiber-optic links, as the length of the fiber increases, PDL can have a more substantial impact on proper reception of the optical signals.

In scenarios of polarization dependent loss (PDL), the amount of loss experienced in each of the two polarization modes of light may be different, e.g., the loss in the transverse magnetic (TM) mode may be greater/smaller than the loss in transverse electric (TE) mode. This results in a channel matrix F which is non-unitary. In this case, optical demultiplexing with optical phase shift controls alone may be insufficient to fully separate the optical signals which have been mixed in the two polarization modes of light. In such scenarios, a subsequent step of electrical MIMO demultiplexing can be used to remove residual crosstalk, as discussed above with reference to FIGS. 4B, 6A, and 6B.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A dual-polarization (DP) intensity-modulated direct detection (IMDD) receiver comprising:
   an input port configured to receive input light;
   an optical polarization splitter configured to split the input light into a pair of optical transmission paths;
   a pair of photodetectors comprising (i) a first photodetector configured to detect light at a first carrier frequency and output an electrical signal into a first electrical transmission path, and (ii) a second photodetector configured to detect light at a second carrier frequency and output an electrical signal into a second electrical transmission path, wherein the first carrier frequency and the second carrier frequency are separated by a frequency difference, wherein the frequency difference is configured to cause the light detected at the first photodetector and the light detected at the second photodetector to be heterodyne-multiplexed; and
   an electrical 2×2 multi-input-multi-output (MIMO) polarization demultiplexer configured to receive signals from the first electrical transmission path and the second electrical transmission path and, based on the light detected at the first photodetector and the light detected at the second photodetector being heterodyne-multiplexed, perform electrical 2×2 MIMO polarization demultiplexing to output a first demultiplexed signal and a second demultiplexed signal, wherein the DP-IMDD receiver is configured to output the first demultiplexed signal and the second demultiplexed signal using intensity-modulated direct detection.

2. The DP-IMDD receiver of claim 1, wherein the electrical 2×2 MIMO polarization demultiplexer comprises four adjustable gain elements interconnected in a butterfly configuration.

3. The DP-IMDD receiver of claim 2, wherein the electrical 2×2 MIMO polarization demultiplexer comprises:
a first splitter configured to split the first electrical transmission path into a third electrical transmission path and a fourth electrical transmission path;
a second splitter configured to split the second electrical transmission path into a fifth electrical transmission path and a sixth electrical transmission path;
a first gain element configured to apply a controllable gain on the third electrical transmission path;
a second gain element configured to apply a controllable gain on the fourth electrical transmission path;
a third gain element configured to apply a controllable gain on the fifth electrical transmission path;
a fourth gain element configured to apply a controllable gain on the sixth electrical transmission path;
a first summing element configured to sum an output of the first gain element and an output of the third gain element; and
a second summing element configured to sum an output of the second gain element and an output of the fourth gain element.

4. The DP-IMDD receiver of claim 3, further comprising at least one additional electrical transmission path configured with time delays and gains.

5. The DP-IMDD receiver of claim 1, wherein the electrical 2×2 MIMO polarization demultiplexer is configured to perform the electrical 2×2 MIMO polarization demultiplexing in an analog electronic portion of the DP-IMDD receiver.

6. The DP-IMDD receiver of claim 1, wherein the electrical 2×2 MIMO polarization demultiplexer is configured to perform the electrical 2×2 MIMO polarization demultiplexing in a digital electronic portion of the DP-IMDD receiver.

7. The DP-IMDD receiver of claim 6, further comprising:
a first analog-to-digital converter (ADC) configured in the first electrical transmission path between the first photodetector and the electrical 2×2 MIMO polarization demultiplexer; and
a second ADC configured in the second electrical transmission path between the second photodetector and the electrical 2×2 MIMO polarization demultiplexer.

8. The DP-IMDD receiver of claim 1, further comprising:
a first transimpedance amplifier (TIA) configured in the first electrical transmission path between the first photodetector and the electrical 2×2 MIMO polarization demultiplexer; and
a second TIA configured in the second electrical transmission path between the second photodetector and the electrical 2×2 MIMO polarization demultiplexer.

9. The DP-IMDD receiver of claim 1, wherein the frequency difference between the first carrier frequency that the first photodetector is configured to detect and the second carrier frequency that the second photodetector is configured to detect is greater than a signal symbol rate.

10. The DP-IMDD receiver of claim 1, further comprising an optical 2×2 MIMO demultiplexer configured to receive light in the pair of optical transmission paths from the optical polarization splitter, and perform optical 2×2 MIMO polarization demultiplexing to output a pair of optical signals.

11. The DP-IMDD receiver of claim 10, wherein the pair of photodetectors are configured to receive the pair of optical signals that are output from the optical 2×2 MIMO polarization demultiplexer, and
wherein the pair of photodetectors are configured to provide outputs to the first electrical transmission path and the second electrical transmission path which are connected to the electrical 2×2 MIMO demultiplexer.

12. The DP-IMDD receiver of claim 11, wherein the optical 2×2 MIMO demultiplexer provides only partial demultiplexing for one or both of the pair of optical signals that are output from the optical 2×2 MIMO demultiplexer.

13. The DP-IMDD receiver of claim 10, wherein the optical 2×2 MIMO demultiplexer comprises:
a first optical phase shifter configured to receive light from the pair of optical transmission paths from the optical polarization splitter and apply a first relative phase shift between the pair of optical transmission paths;
a first 2×2 optical coupler configured to combine light from the pair of optical transmission paths and output light to a second pair of optical transmission paths;
a second optical phase shifter configured to apply a second relative phase shift between the second pair of optical transmission paths;
a second 2×2 optical coupler configured to combine light from the second pair of optical transmission paths and output light to a third pair of optical transmission paths.

14. The DP-IMDD receiver of claim 13, wherein the optical 2×2 MIMO demultiplexer further comprises:
a third optical phase shifter configured to apply a third relative phase shift between the third pair of optical transmission paths;
a third 2×2 optical coupler configured to combine light from the third pair of optical transmission paths and output light to a fourth pair of optical transmission paths; and
a pair of MIMO outputs configured to output the pair of optical signals from the fourth pair of optical transmission paths.

15. The DP-IMDD receiver of claim 14, wherein the third optical phase shifter is configured to operate between 0 and $+n\pi$, based on the value of the first relative phase shift being $c-\pi/2$, and is configured to operate between $-n\pi$ and 0, based on the value of the first relative phase shift being $c+\pi/2$, where n is an integer.

16. The DP-IMDD receiver of claim 13, wherein a value of the first relative phase shift applied by the first optical phase shifter is binary among $c+\pi/2$ and $c-\pi/2$, where c is a real number.

17. The DP-IMDD receiver of claim 13, wherein the second optical phase shifter is configured to apply a value of the second relative phase shift within a finite range that includes $-n\pi$ and $+n\pi$, where n is an integer.

18. The DP-IMDD receiver of claim 1, wherein the DP-IMDD receiver is configured to output the first demultiplexed signal and the second demultiplexed signal without any optical MIMO demultiplexing.

19. A method of performing dual-polarization (DP) intensity-modulated direct detection (IMDD) reception, comprising:
receiving input light through an input port;
splitting, through an optical polarization splitter, the input light into a pair of optical transmission paths; and performing intensity-modulated direct-detection to output a first demultiplexed signal and a second demultiplexed signal, wherein performing the intensity-modulated direct-detection comprises:

(i) detecting light at a first carrier frequency with a first photodetector and outputting an electrical signal into a first electrical transmission path, and (ii) detecting light at a second carrier frequency with a second photodetector and outputting an electrical signal into a second electrical transmission path, wherein the first carrier frequency and the second carrier frequency are separated by a frequency difference, wherein the frequency difference is configured to cause the light detected with the first photodetector and the light detected with the second photodetector to be heterodyne-multiplexed, and based on the light detected with the first photodetector and the light detected with the second photodetector being heterodyne-multiplexed, performing electrical 2×2 multi-input-multi-output (MIMO) polarization demultiplexing based on the first electrical transmission path and the second electrical transmission path, to output the first demultiplexed signal and the second demultiplexed signal.

20. The method of claim 19, wherein the frequency difference between the first carrier frequency detected by the first photodetector and the second carrier frequency detected by the second photodetector is greater than a signal symbol rate.

21. The method of claim 19, comprising:

performing optical 2×2 MIMO demultiplexing by receiving light in the pair of optical transmission paths from the optical polarization splitter, and performing optical 2×2 MIMO polarization demultiplexing to output a pair of optical signals.

* * * * *